W. G. KELLY.
BUNK BLOCK.
APPLICATION FILED JULY 16, 1918.

1,340,055.

Patented May 11, 1920.

Witnesses

Inventor
W. G. Kelly
By
Attorneys

UNITED STATES PATENT OFFICE.

WILLIAM G. KELLY, OF HOT SPRINGS, ARKANSAS.

BUNK-BLOCK.

1,340,055.  Specification of Letters Patent.  Patented May 11, 1920.

Application filed July 16, 1918. Serial No. 245,159.

*To all whom it may concern:*

Be it known that I, WILLIAM G. KELLY, a citizen of the United States, residing at Hot Springs, in the county of Garland, State of Arkansas, have invented certain new and useful Improvements in Bunk-Blocks; and I do hereby declare the following to be a full, clear, and exact description of the invention, such as will enable others skilled in the art to which it appertains to make and use the same.

The invention relates to wagon bodies and especially to the standards thereon. Specifically it is a log stop for use on log cars, wagons or other vehicles, and more particularly a stop of the class of adjustable bunk blocks, for log wagons or other carriers for a load of logs or the like.

The primary object of the invention is, the provision of a standard, bunk block, or stop of this character, pivoted astride the bunk or the end sill of a wagon, car or the like, for hauling logs so as to provide a stop for the logs when loaded thereon to prevent the rolling of the same therefrom or the accidental falling of a log from the load when said stop is in raised position. The lowering of the stop enables a hauler to remove the logs from the wagon, car or the like without necessitating detaching the device.

Another object of the invention is, the provision of a device of this character, wherein the same may be quickly and easily operated without regard to the pressure against the same, of a log or logs, and will expedite the handling of the logs when loading the same upon a wagon, car or the like and on the removal thereof from the same.

A further object of the invention is, the provision of a device of this character which is extremely simple in construction, thoroughly reliable and efficient in its purpose, readily and easily operated with despatch, capable of being locked in position for holding the logs and may be readily released to free the logs upon a wagon, car or the like, and also one which is inexpensive to manufacture and install.

With these and other objects in view, the invention consists in the features of construction, combination and arrangement of parts as will be hereinafter fully described, illustrated in the accompanying drawing and pointed out in the claims hereunto appended.

Figure 1:
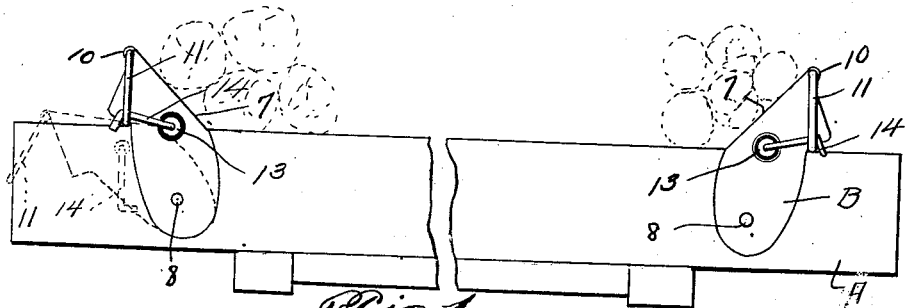
Figure 1, is an elevation of a sill, beam or bolster of a wagon or car bed, showing a block constructed in accordance with the invention, applied thereto, one of the devices being shown by full lines in raised position and by dotted lines in lowered position.
Figure 2:
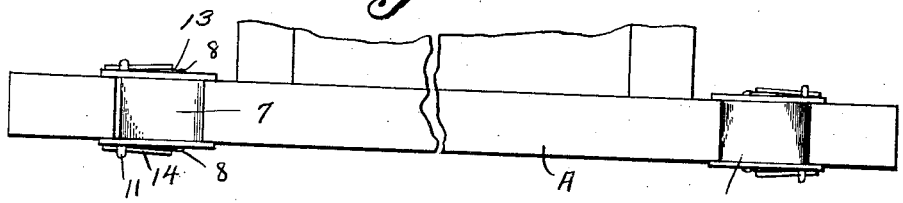
Fig. 2, is a top plan view of the same.
Figure 3:
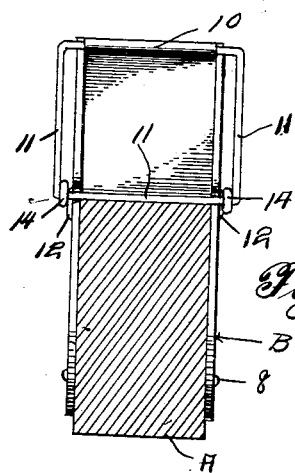
Fig. 3, is a sectional view through the right end of the sill in Fig. 2 looking in the direction of the block.
Figure 4:
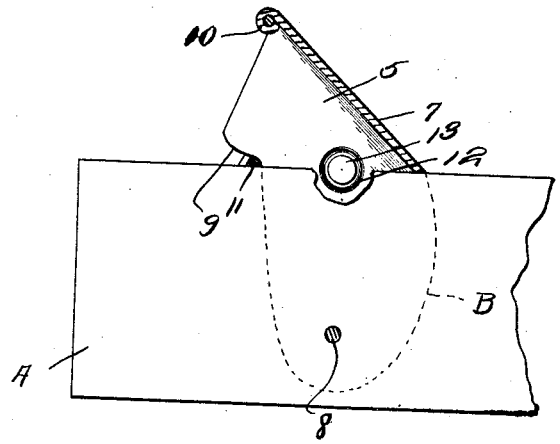
Fig. 4, is a fragmentary vertical longitudinal sectional view.

Referring to the drawing in detail, A, designates generally the end cross sill or beam of a wagon or car bed of the usual well known construction, and thereon intermediate the ends of the same or near each end is mounted the device B, hereinafter fully described.

The device B comprises an inverted substantial U-shaped block forming spaced parallel side cheeks constituting pivot ears 5 and an angular web portion 7 constituting a stop face or abutment when the block is in elevated or raised position, and in this position, the portion 7 is inwardly inclined for the contact with a log adjacent thereto when loaded upon the wagon or car so as to hold the load and prevent the logs rolling from the wagon or car. On swinging the block to inactive position the web 7 rests flat against the upper face or sill or beam A so that the log or logs will roll over the same without interference by the block for the removal of the log or logs from the car or wagon, in the usual well known manner.

The device B is swingingly supported upon and astride the sill or beam A and has arranged transversely through the ears 5 a pivot pin 8 which is passed transversely through the sill or beam A for holding the block thereon and pivotally supporting it.

The edges of the ears 5 opposite the web portion 7 of the block are cut out or notched to provide inset shoulders 9, while formed at the outer edge of the web is a pintle sleeve 10 in which is swingingly engaged a locking bail 11 adapted to be swung in under and into engagement with the shoulders 9 so that the cross bar of the bail will bridge the sill or beam A when the block is raised to hold the same in active position. On swinging the bail 11 out from the shoulders 9 and outwardly and upwardly, the block is unlocked and free to be lowered for the rolling of the log or logs from the wagon or car.

Struck outwardly from the side cheeks 5 are circular bosses 12, in the center of each is pivotedly engaged at 13 a latch hook 14 which is located alongside the ear 5, and is adapted to engage with the bail 11 when in locking position to fasten the same therein. Each boss 12 forms a seat for the pivoted end of the latch hook 14 so as not to interfere with the swinging of the block to raised or lowered position when unlocked, and on the lowering of the block the hooks 12 depend therefrom in unlatching position at opposite sides thereof.

It will be apparent that irrespective of the pressure of the load of logs or the like upon the block when in raised or active position, it can be readily unlatched and brought to lowered or inactive position for the rolling of the logs from the wagon, car or the like.

It is of course understood, that changes, variations and modifications may be made in the invention without departing from the spirit of the invention as fall properly within the appended claims.

From the foregoing it is thought that the features and construction of the device will be clearly understood and therefore a more extended explanation has been omitted.

What is claimed is:

1. The combination with a bolster of a vehicle; of a bunk block supported thereon to form a stop and including a cross web adapted to lie flat against the top of the bolster when lowered and at an inward angle thereto when raised, and cheek plates passing astride and pivoted to the bolster; means to lock the block raised relative to the bolster, and latching means for holding the locking means active, the block being movable from its raised position in a direction away from the load supporting portion of the bolster.

2. The combination with a bolster of a load carrier; of an inverted substantially U-shaped stop including cheek plates straddling said bolster and pivoted thereto and a cross web having an abutting face adapted to lie flat against the bolster when the stop is swung in one direction and also adapted to be inclined to the supporting surface of the bolster when the stop is swung in the opposite direction, a locking bail swingingly connected to the stop at the top of its web, and shoulders formed on the cheeks to be engaged by the bail for locking the stop against movement when said web is disposed at an inclination to the bolster.

3. The combination with a bolster of a load carrier; of an inverted substantially U-shaped stop including a cross web and side cheeks straddling said bolster and pivoted to its sides, a locking bail swingingly connected to the web, shoulders formed on the cheeks to be engaged by the bail for locking the stop upright upon the bolster, and latch hooks carried by the cheeks and engaging the bail when the latter is in locking position.

In testimony whereof, I affix my signature, in the presence of two witnesses.

WILLIAM G. KELLY.

Witnesses:
  JOHN A. BROUGHTON,
  NEED F. BROUGHTON.